United States Patent Office 3,256,289
Patented June 14, 1966

3,256,289
CARBOCYCLIC SUBSTITUTED PIPERIDYL DIOXANES
Waldo Richard Hardie, Walnut Creek, Calif., assignor to Cutter Laboratories, Inc., Berkeley, Calif., a corporation of Delaware
No Drawing. Filed Dec. 7, 1964, Ser. No. 416,602
9 Claims. (Cl. 260—294.7)

This invention relates to compositions of matter classified in the art of chemistry as substituted dioxanes and to processes for making and using such compositions.

This application is a continuation-in-part of application S.N. 88,285, filed February 10, 1961, now abandoned, and application S.N. 115,309, filed June 7, 1961, and now abandoned.

The invention sought to be patented, in its composition of matter aspect, is described as residing in the concept of a chemical compound having the piperidyl-1,3-dioxane structure, in which structure the piperidine ring is attached by a ring carbon atom thereof directly to a ring carbon atom other than the 2-position carbon atom of the dioxane ring, in molecular chemical combination by carbon-to-carbon linkage to the 2-position carbon atom of the dioxane ring, with a neutral cyclic structure, containing up to 3 rings including a carbocyclic ring in the carbon-to-carbon linkage with the 2-position carbon atom of the dioxane ring.

The tangible embodiments of this invention, in their free base, acid addition and quaternary ammonium forms, are novel chemical compounds whose utility includes the inherent applied use characteristic of exhibiting pharmacological activity, including local anesthetic, anti-inflammatory, preferential ganglionic blocking and anti-spasmodic activity, as evidenced by pharmacological evaluation according to standard test procedures.

The novel structural feature of all the tangible embodiments of this invention is the molecular chemical combination of the piperidyl-1,3-dioxane structure with a carbocyclic ring-containing neutral, i.e., essentially non-basic and non-acidic, cyclic structure at the 2-position of the dioxane ring. The novel chemical compounds, resulting from this chemical combination of a neutral cyclic structure with the basic piperidyl dioxane structure, are useful in scientific research particularly in the field of pharmacology because of their pharmacological activity. These tangible embodiments possess the inherent applied use of modifying body functions in laboratory test animals, especially those influenced by the autonomic system and nerve impulses transmitting pain stimulus to the brain. In the representative compounds made and tested, the former activity manifested itself as papavarine-like anti-spasmodic activity and the activity on nerve impulses transmitting pain stimuli manifested itself as local anesthesia. As in all classes of chemical compounds, the manifestation of pharmacological activity varies in degree and character from member to member in this novel class of compounds. Thus, other pharmacological activities possessed by members of the group of compounds of this invention include anti-inflammatory, ganglionic blocking, anti-cholinergic and spasmolytic activity.

Structurally, the piperidine ring of the compounds of this invention can be attached to the 4- or 5-position carbon atom of the dioxane ring by the 2-, 3- or 4-position carbon atom of the piperidine ring. Those compounds in which the piperidine ring is attached by its 2-position carbon atom have, as a class, greater pharmacological activity and thus are preferred. However, those attached by the 4-position carbon atom also have valuable pharmacological activity. This attachment is direct, i.e., a ring carbon atom of the piperidine ring is bonded directly to the 4- or 5-position carbon atom of the dioxane ring.

The neutral cyclic structure at the 2-position carbon atom of the dioxane ring contains at least one carbocyclic ring, which ring is in the carbon-to-carbon linkage with the 2-position carbon atom of the dioxane ring. The carbocyclic ring can be cycloalkyl, aryl, or spiroalkyl in which the 2-position carbon atom of the dioxane ring is also a ring carbon atom of the carbocyclic ring. Examples of cycloalkyl rings are cyclopropyl, cyclopentyl, cyclohexyl, cycloheptyl, 1,4-methylenecyclohexyl, cyclopentenyl, cyclohexenyl, cyclopentadienyl, cyclohexadienyl, decahydronaphthyl, octahydronaphthyl, perhydroanthryl and perhydrophenanthryl. Of these, cyclohexyl is preferred. Examples of aryl rings are phenyl, biphenylyl, p-benzylphenyl, naphthyl, fluorenyl and phenanthryl. Of these, those in which the aryl group is a benzene ring are preferred. Examples of spiroalkyl rings are those in which the 2-position carbon atom of the dioxane ring is also part of a cyclopentyl, cyclohexyl, cycloheptyl or 9-fluorenyl ring.

The cycloalkyl or aryl ring described above can be attached directly to the 2-position ring carbon atom of the dioxane ring or separated by a carbon chain containing 1–8 carbon atoms in the chain preferably no more than one carbon atom. Examples of such cyclic systems in which the carbocyclic ring is separated by a carbon chain are aralkyl, e.g., benzyl, diphenylmethyl, triphenylmethyl, phenethyl, α-phenylethyl, α-phenylpropyl and α-cyclopentyl-benzyl, cycloalkylalkyl, e.g., cyclohexyl-methyl and dicyclohexyl-methyl. Of this class, preferred are benzyl and diphenylmethyl. The cyclic structure can be a combination of cycloalkyl and aryl, e.g., indanyl and tetrahydronaphthyl attached by either the benzene or cycloalkyl ring.

Of the above-described cyclic structures, the aryl are preferred over cycloalkyl and spiroalkyl. Especially preferred are aryl containing 1–3, preferably 1–2, benzene rings separated by no more than one carbon atom from the 2-position carbon atom of the dioxane ring, e.g., phenyl, benzyl, diphenylmethyl and triphenylmethyl.

When the cyclic structure described above is aryl or cycloalkyl, i.e., one which satisfies only one valence of the 2-position carbon atom of the dioxane ring, the remaining valence can be satisfied by a hydrogen atom, or an essentially neutral alkyl group, e.g., a lower-alkyl group, including substituted lower-alkyl, e.g., hydroxy-lower-alkyl, halo-lower-alkyl, lower-alkoxy-lower-alkyl and lower-acyloxy-lower-alkyl, a second neutral carbocyclic cyclic structure as defined above, or a neutral, i.e., essentially non-acidic and non-basic, heterocyclic structure, preferably in which the hetero atom or atoms are oxygen or sulfur, e.g., furyl, tetrahydrofuryl, pyranyl, tetrahydropyranyl, dioxanyl, thienyl, benzofuryl, etc., attached by a ring carbon atom. Preferably such a heterocyclic structure contains no more than 2 and more preferably only one heteroatom. In the most active and thus preferred compounds, the second valence of the 2-position carbon atom is satisfied by a second neutral cycloalkyl or aryl structure as defined above, most preferably aryl. Examples of such compounds are 2,2-diphenyl-, 2,2-dicyclohexyl-, 2,2-dibenzyl-, 2-phenyl-2-benzyl-, and 2-phenyl-2-diphenylmethyl-4-(2-piperidyl)-1,3-dioxane and the corresponding compounds in which the piperidine ring is attached to the 5-position carbon atom of the dioxane ring.

The cyclic structure at the 2-position of the dioxane ring, including substituents thereon preferably has a molecular weight between 70 and 300, more preferably less than 250. When the 2-position carbon atom bears a lower-alkyl, substituted lower-alkyl, or second cyclic structure, in addition to the cyclic structure described above, its molecular weight is included in this preferred molecular weight upper limit. The term "lower" e.g., when used in "lower-alkyl," means containing up to eight carbon atoms.

Because novelty and utility of the compounds are the result of the molecular chemical combination of the piperidyl-1,3-dioxane structure in combination with the carbocyclic ring-comprising structure at the 2-position carbon atom, embraced within the scope of the compounds having this structural combination are those having one or more, usually not more than a total of four and preferably not more than three, simple substituents on the piperidine and carbocyclic rings. Those which can be on a carbon atom thereof include halo, e.g., chloro, bromo and fluoro, lower-alkyl including methyl, ethyl, propyl and octyl, trifluoromethyl, trichloromethyl, lower-alkoxy including methoxy and ethoxy, aryloxy and aralkoxy including benzyloxy and phenoxy, lower-acyloxy including acetoxy, propoxy and benzoxy, carbo-lower-alkoxy including carbethoxy and carbomethoxy, nitro, and acetamido. The nitrogen atom of the piperidine ring can bear a hydrogen atom so that the resulting piperidyl-1,3-dioxane is a secondary amine, or can be substituted to provide a tertiary amine, e.g., with lower-alkenyl including allyl, aryl, aralkyl including benzyl and phenethyl, alkaryl including tolyl, lower-alkyl including methyl, ethyl, propyl, butyl, octyl, hydroxyalkyl, e.g., hydroxyethyl, hydroxyalkyleneoxyalkyl, e.g., hydroxyethyleneoxyethyl, acyloxyalkyl, e.g., acetoxyethyl, acetoxypropyl, propionyl-oxyethyl, aminoalkyl, e.g., aminoethyl, methylaminoethyl, dimethylaminoethyl, diethylaminoethyl, pyrrolidinoethyl, piperidinoethyl, morpholinoethyl and the corresponding γ- and ω-amino-substituted propyl, butyl, etc. These N-substituted piperidyl dioxanes can be further alkylated, e.g., with methyl iodide, ethyl bromide, benzyl chloride, to provide the quaternary ammonium compounds of this invention or oxidized with, e.g., hydrogen peroxide or an organic peroxide, to produce the corresponding N-oxides which also possess the useful pharmacological activity referred to hereinbefore. Preferably, so that the activity of the compounds is predominantly that resulting from the novel combination of the piperidyl-1,3-dioxane structure and a cyclic structure at the 2-position, the sum of the molecular weight of these substituents is less than the sum of the molecular weights of the unsubstituted piperidine, dioxane and 2-position cyclic ring systems, e.g., less than 200 and more preferably less than 150, so that the resulting compound has a total molecular weight of less than 500, preferably less than 400, in free base form.

Preferred sub-classes of compounds within this invention are the piperidyl-2-carbocyclic substituted-1,3-dioxanes meeting one or more of the following requirements: (a) other than the 2-position carbon atom of the dioxane ring the ring carbon atoms of the piperidyl-1,3-dioxane structure are unsubstituted; (b) other than the piperidine ring nitrogen atom and the dioxane ring oxygen atoms, the piperidyl-1,3-dioxane structure is hydrocarbon; (c) the 1-position piperidine substituent is hydrogen, hydrocarbon of 1–12 carbon atoms, preferably 1–8 carbon atoms, e.g., alkyl or aralkyl as described above, or amino-substituted alkyl, preferably tertiary amino substituted-lower-alkyl as described above; (d) both valences of the 2-position dioxane carbon atom are satisfied by a cyclic structure as defined herein; (e) the piperidine ring is attached by the 2-position carbon atom thereof to the dioxane ring; (f) the cyclic structure contains at least one benzene ring and more preferably contains only benzene rings, separated by no more than one carbon atom from the 2-position carbon atom of the dioxane ring; (g) the cyclic structure is hydrocarbon, preferably of a molecular weight less than 200; (h) the cyclic structure is phenyl; (i) the compounds are in their acid addition salt form, preferably as their hydrochloride; (j) the alpha racemate is isolated substantially free from the beta racemate, either as a mixture of its optical isomers or in the form of either of its optical isomers substantially free from the other isomer.

One preferred sub-class of compounds of this invention are those of a molecular weight less than 400 represented by the formula

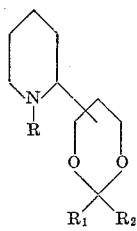

wherein R is hydrogen, hydrocarbon of 1–8 carbon atoms, including alkyl, alkenyl, aryl and aralkyl, lower-alkanoyl, $R_3R_4N$-lower-alkyl or $R_3R_4N$-lower-alkanoyl, wherein $R_3$ and $R_4$ are H, lower-alkyl or collectively with the nitrogen atom pyrrolidino, piperidino or morpholino, hydroxy-lower-alkyl or hydrocarbon-lower-acyloxy-lower-alkyl, $R_1$ is phenyl, benzyl or diphenylmethyl in which the substituents other than hydrogen are up to two of halo, trifluoromethyl, lower-alkyl, lower-alkoxy, lower-acyloxy, carbo-lower-alkoxy, nitro, or acetamido and $R_2$ is hydrogen, lower-alkyl or $R_1$, most preferably $R_1$, and the piperidine ring is attached to the 4- or 5-position of the dioxane ring.

Within this preferred sub-class of compounds the most preferred are those of the above formula wherein R is hydrogen or hydrocarbon of 1–8 carbon atoms, $R_1$ is phenyl, benzyl or diphenylmethyl, and $R_2$ is hydrogen, lower-alkyl or $R_1$. Of these especially preferred are those in which R is H.

The manner of making and using the invention will now be generally described so as to enable a person skilled in the art to make and use the same, as follows:

The dioxanes of this invention can be prepared by the general method of condensing the appropriate ketone, aldehyde or acetal with a piperidyl-1,3-propanediol in the presence of an acid catalyst. The starting acetals can be prepared by several methods. One method, Method A, described by Lorette and Howard, J. Org. Chem., 25, 521 (1960), involves an exchange reaction using the ketone whose acetal is desired and 2,2-dimethoxypropane. This method was used with several aliphatic and mixed ketones and with benzophenone, whose acetal can also be prepared by reaction with dimethyl sulfite. Another method described by W. Schlenk and E. Bergmann, Ann. Chem., 463, 98 (1928), Method B, shown below, was used to prepare substituted aromatic ketones, 4,4'-dimethoxybenzophenone, phenyl 2-thienyl ketone, and 9-fluorenone.

$$R^1R^2CO \xrightarrow{PCl_5} R^1R^2CCl_2 \xrightarrow{NaOCH_3} R^1R^2C(OCH_3)_2$$

$R^1$ and $R^2$ comprise a cyclic structure as described above. A further method, involving the preparation of the corresponding 4- or 5-(4-pyridyl)-1,3-dioxane which is then hydrogenated to produce the corresponding 4- or 5-(4-piperidyl)-1,3-dioxane.

The starting piperidyl-1,3-propanediol can be prepared by hydrogenating the corresponding pyridyl-1,3-propanediol hydrochloride in water, acetic acid or methanol using platinum oxide catalyst. Rhodium-on-carbon is also a suitable catalyst.

The compounds of this invention and their preparation are illustrated by the formulae showing the preparation of 2,2-diphenyl-4-(2-piperidyl)-1,3-dioxane:

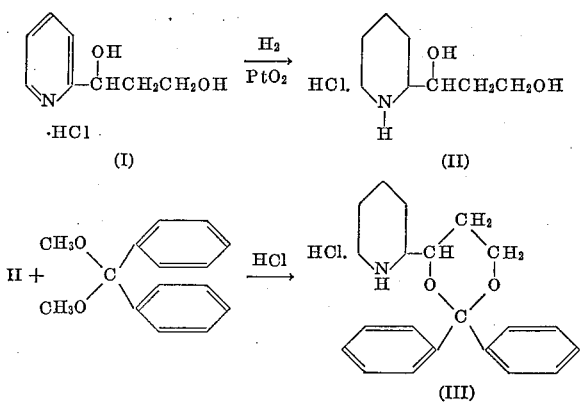

Starting with 2-(2-pyridyl)-propane-1,3-*diol* produces 2,2-diphenyl-5-(2-piperidyl)-1,3-dioxane.

One of the starting piperidine glycols has two asymmetric centers and is thus capable of existing as two racemic mixtures and four stereoisomers. Use of a mixture of such racemates as the reactant produces a mixture of two or more dioxane racemic modifications which can then be separated by conventional procedures. The use of a separated racemate of the starting glycol as the reactant leads to the corresponding racemate form of the dioxane thus produced, substantially free from the other racemate form.

One aspect of the invention is the pure optical isomers of a racemate, substantially free from the other optical isomer. Resolution of each of the racemates into their pure optical isomers is accomplished conventionally, e.g., by forming an acid addition salt of the free base form with an optically active organic acid, e.g., tartaric acid, in a solvent, e.g., methanol or other lower-alkanol. After separation and purification, the acid addition salt can then be converted back to the free base form and then to an optically pure salt of the desired acid, e.g., the hydrochloride.

In the preferred preparative approach for making the dioxane compositions of this invention, a piperidyl-1,3-propanediol is caused to undergo an alcohol exchange reaction with the appropriate acetal using a strong acid catalyst, most conveniently hydrogen chloride. A solvent having a slightly higher boiling point than the alcohol used to form the acetal is desirable. Isopropanol is a particular suitable solvent for the reaction. The precise proportions of reactants, the presence or absence of a solvent, and the reaction time and temperature employed are not critical. A very slight excess of hydrogen chloride in the reaction mixture initiates the reaction.

The piperidyl-1,3-dioxanes are the starting materials for the preparation of the N-substituted piperidine compounds described herein. The method of W. E. Weaver and W. M. Whaley, J. Am. Chem. Soc., 69, 516 (1947), when used for preparing the N-acyl derivatives, gives better yields when the amount of acyl chloride is increased to two moles per mole of amine. N-acyl compounds are reduced with lithium aluminum hydride to give the corresponding N-alkyl derivatives. N-methyl-dioxanes are prepared by catalytic hydrogenation in the presence of formaldehyde, following the procedure of R. E. Bowman and H. H. Stroud, J. Chem. Soc., 1342 (1950).

For all compounds shown in the examples, procedures described for the preparation of the mixed racemates of a dioxane are also illustrative of the preparation of a pure racemate of the same structure and vice versa.

From the manner in which the compounds of this invention are prepared, the nature of the 2-position substituents in the dioxane ring is determined by the choice of reactant aldehyde, ketone or acetal. For example, methyl cyclohexyl ketone yields a compound in which the valences of the 2-position carbon atom are satisfied by a carbocyclic group (cyclohexyl) and an alkyl group (methyl); dibenzyl ketone yields a compound in which the valences are satified by two separate carbocylic groups (benzyl), and cyclohexanone yields a compound in which the valences are satisfied by the 2-position carbon atom being itself part of the 2-position carbocycle (spiroalkane).

The compounds of this invention can exist in their free base, acid addition and quaternary ammonium salt forms. The acid-addition salt form of the compounds of this invention can be prepared in the conventional manner by reacting the free base form of the compounds of this invention with an inorganic acid, for example, hydrochloric, hydrobromic, hydiodic, sulfuric, and phosphoric, or an organic acid, for example, acetic, lactic, tartaric, glycolic, citric, tannic, commonly used for this purpose. These salts are convenient forms for the isolation and purification of the compounds of this invention and for the administration of the compounds for the pharmacological purposes set forth herein. In these and other respects the acid addition salt form of the compounds of this invention is the equivalent of the free base form.

The quaternary ammonium salt form of the compounds of this invention can be prepared in the known manner by reacting the free base form of a tertiary amine of this invention with an alkyl halide, for example, methyl bromide, ethyl chloride, propyl iodide, benzyl chloride, etc. The anions of the various salts can be exchanged for different anions, where desired, by conventional techniques, e.g., with ion exchange resins.

The foregoing discussion is offered to illustrate methods suitable for the practice of our invention and not to limit its scope. The invention is further illustrated by the following examples. (All temperatures are reported in degrees centigrade.)

*Example 1.—2,2-diphenyl-4-(2-piperidyl)-1,3-dioxane*

A mixture of 100 g. of 1-(*2-piperidyl*)-1,3-propanediol hydrochloride, 125 g. dimethoxydiphenylmethane and 500 ml. of isopropanol were mixed together. The mixture was warmed on the steam bath and 0.3 g. of dry hydrogen chloride dissolved in 5 ml. of isopropanol was added. A precipitate then began to form. The mixture was refluxed for 1.5 hrs. and filtered after cooling by flash evaporation of a portion of the solvent. The precipitate was washed with small portions of ether and isopropanol and dried to give 143 g., M.P. 260–262° (79.5 percent), of crude product. Starting with this material, a series of three recrystallizations from methanol yielded 10.8 g. of product melting at 281°, which was a pure racemate and was called the β-racemate of 2,2-diphenyl-4-(2-piperidyl)-1,3-dioxane hydrochloride.

*Analysis.*—Calculated for $C_{21}H_{25}NO_2 \cdot HCl$: C, 70.08; H, 7.28; N, 3.89. Found: C, 70.22; H, 7.26; N, 3.96.

The major liquors from the first recrystallization from methanol above were evaporated to a solid residue and recrystallized from methanol once to give 61 g. of product melting at 257–258° which was called the α-racemate of 2,2-diphenyl-4-(2-piperidyl)-1,3-dioxane hydrochloride.

*Analysis.*—Calculated for $C_{21}H_{25}NO_2 \cdot HCl$: C, 70.08; H, 7.28; N, 3.89. Found: C, 69.97; H, 7.38; N, 4.23.

These compounds possess anti-inflammatory activity and are DCA antagonists. They possess preferential parasympathetic ganglionic blocking and local anesthetic activity.

The intermediate 1-(2-piperidyl)-1,3-propanediol was prepared from 215.5 g. of 1-(2-pyridyl)-1,3-propanediol, dissolved in methanol and neutralized with 184 g. of concentrated hydrochloric acid. This solution (750 ml.) was catalytically hydrogenated at 60 p.s.i. of hydrogen in the presence of 3 g. of platinum oxide. The product was isolated by evaporation of the solution, after removal of the catalyst, to a thick syrup at reduced pressure on a steam bath. The syrup was diluted with an equal volume of isopropanol followed by evaporation three times, leaving a residue of 1-(2-piperidyl)-1,3-propanediol hydrochloride.

In another procedure for the preparation of 1-(2-piperidyl)-1,3-propanediol hydrochloride, 26 g. of 1-(2-pyridyl)-1,3-propanediol free base was dissolved in 50 ml. of water containing sufficient concentrated hydrochloric acid to neutralize the base, together with 0.5 g. of platinum oxide and this mixture was hydrogenated at 60 pounds per square inch pressure of hydrogen. After removal of the catalyst the solution was evaporated at reduced pressure to a sirupy residue. This residue was twice diluted with chloroform and evaporated to a thick sirupy residue of 1-(2-piperidyl)-1,3-propanediol hydrochloride.

*Analysis.*—Calculated for $C_8H_{17}NO_2 \cdot HCl$: C, 49.10; H, 9.27; N, 7.16. Found: C, 48.90; H, 8.90; N, 7.3.

The intermediate dimethoxydiphenylmethane can be prepared by acetal exchange with 2,2-dimethoxypropane according to the method of N. B. Lorette and W. L. Howard, J. Org. Chem., 25, 521 (1960). Another convenient method uses dimethyl sulfite following the procedure of W. Voss and E. Blanke, Ann. Chem., 485, 283 (1931).

*Example 2.—2-ethyl-2-phenyl-4-(2-piperidyl)-1,3-dioxane*

A mixture of 18.1 g. of 1-(2-piperidyl)-1,3-propanediol hydrochloride and 23.6 g. of ethylphenyldipropoxymethane in isopropyl alcohol was heated on the steam bath while stirring the reaction mixture. Dry hydrogen chloride was admitted below the surface of the liquid until the mixture was strongly acidic. Almost immediately a cake formed which was broken up. The heating was continued so as to give slow distillation of the solvent which was replenished as needed during a period of about 8 hours. All solvent was then removed at reduced pressure. The reaction product was washed with ether and the residue was crystallized from isopropanol to give 16.8 g. of 2-ethyl-2-phenyl-4-(2-piperidyl)-1,3-dioxane hydrochloride melting at 248–249°.

*Analysis.*—Calculated for $C_{17}H_{25}NO_2 \cdot HCl$: C, 65.47; H, 8.41; N, 4.49. Found: C, 65.48; H, 8.61; N, 4.55.

This compound is a parasympathetic ganglionic blocker and has local anesthetic and anti-inflammatory activities.

The ethylphenyldipropoxymethane was prepared according to Lorette and Howard, supra.

*Example 3.—4-(1-methyl-2-piperidyl)-2,2-diphenyl-1,3-dioxane*

To a solution of 30.5 g. of 2,2-diphenyl-4-(2-piperidyl)-1,3-dioxane hydrochloride and about 37 g. of 37 percent formalin in methanol was added about 3 g. of 10 percent palladium on charcoal. This mixture was then shaken with hydrogen gas at 50 pounds per square inch. Absorption of hydrogen stopped with the uptake of one mole of hydrogen per mole of dioxane. The catalyst was removed and the solution evaporated to give 17 g. of crude material which was recrystallized twice from methanol to give 9.8 g., M.P. 290° dec., of 4-(1-methyl-2-piperidyl)-2,2-diphenyl-1,3-dioxane hydrochloride.

*Analysis.*—Calculated for $C_{22}H_{27}NO_2 \cdot HCl$: C, 70.67; H, 7.55; N, 3.75. Found: C, 70.40; H, 7.72; N, 3.96.

This compound is a preferential parasympathetic ganglionic blocker and has local anesthetic and anti-inflammatory activities.

*Example 4.—4-(1-benzoyl-2-piperidyl)-2,2-diphenyl-1,3-dioxane*

2,2-diphenyl-4-(2-piperidyl)-1,3-dioxane hydrochloride (45 g.) was placed in a flask with 50 ml. of 40 percent sodium hydroxide and 300 ml. ethylene dichloride. After stirring vigorously for one hour and chilling the mixture to −10°, 35 g. of benzoyl chloride was admitted drop-wise during a period of 45 minutes. The stirring was continued and the solution slowly warmed to room temperature. The solvent phase was separated and the aqueous phase was extracted with benzene. The combined solvent phases were dried over potassium carbonate and evaporated to a residual oil which was crystallized from ethyl acetate to give 36 g., M.P. 135°, of (4-(1-benzoyl-2-piperidyl)-2,2-diphenyl-1,3-dioxane.

*Analysis.*—Calculated for $C_{28}H_{29}NO_3$: C, 78.66; H, 6.84; N, 3.28. Found: C, 78.58; H, 7.02; N, 3.32.

*Example 5.—2,2-diphenyl-5-(2-piperidyl)-1,3-dioxane*

Following the procedure of Example 1, 32 g. of 2-(2-piperidyl)-1,3-propanediol hydrochloride and 46 g. of dimethoxydiphenylmethane were reacted to give 34 g. of 2,2-diphenyl-5-(2-piperidyl)-1,3-dioxane hydrochloride, M.P. 267° dec., after recrystallization from ethanol.

*Analysis.*—Calculated for $C_{21}H_{25}NO_2 \cdot HCl$: C, 70.08; H, 7.28; Cl, 9.85. Found: C, 69.84; H, 7.01; Cl, 10.04.

This compound possesses local anesthetic and spasmolytic activities.

The intermediate 2-(2-piperidyl)-1,3-propanediol hydrochloride was prepared by catalytic hydrogenation of 92 g. 2-(2-pyridyl)-1,3-propanediol in 200 ml. of 80 percent acetic acid using 1.0 g. of platinum oxide as catalyst. The product was filtered and evaporated at 15 mm. pressure on the steam bath to a sirupy residue which was made strongly basic with aqueous caustic and exhaustively extracted with chloroform. The combined chloroform extracts were evaporated to a residue which was distilled to give 55.8 g., B.P. 148–157° (1.5 mm.), $n_D^{25}$ 1.5055, of product. This free base, dissolved in water, was converted to the hydrochloride by neutralization with hydrochloric acid. The solution was then evaporated on the steam bath (15 mm.) and the sirupy residue was diluted with chloroform and re-evaporated twice to give a heavy sirup suitable for use in preparing dioxanes.

*Analysis.*—Calculated for $C_8H_{17}NO_2 \cdot HCl$: C, 49.10; H, 9.27; Cl, 18.12. Found: C, 48.90; H, 8.9; Cl, 17.9.

*Example 6.—5-(1-methyl-2-piperidyl)-2,2-diphenyl-1,3-dioxane*

Following the procedure of Example 3, 26.5 g. of 5-(2-piperidyl)-2,2-diphenyl-1,3-dioxane hydrochloride was catalytically N-methylated and the product recrystallized from ethanol to give 10.6 g., M.P. 258–260° dec., of 5-(1-methyl-2-piperidyl)-2,2-diphenyl-1,3-dioxane hydrochloride.

*Analysis.*—Calculated for $C_{22}H_{27}NO_2 \cdot HCl$: C, 70.66; H, 7.55; Cl, 9.48. Found: C, 71.03; H, 7.26; Cl, 9.22.

This compound possesses local anesthetic, spasmolytic and anti-inflammatory activities.

*Example 7.—2-(2,2-diphenyl-1,3-dioxan-5-yl)-1,1-dimethylpiperidinum iodide*

An aqueous solution of 7.3 g. 5-(1-methyl-2-piperidyl)-2,2-diphenyl-1,3-dioxane hydrochloride was made alkaine with potassium hydroxide solution and extracted with ethyl ether. The ether solution was dried over potassium carbonate, the solution was evaporated to a solid residue which was dissolved in methanol and refluxed with excess methyl iodide for two hours. The solvents were removed by distillation and the residue crystallized from methanol to give 2.8 g., M.P. 257° of 2-(2,2-diphenyl-1,3-dioxan-5-yl)-1,1-dimethylpiperidinium iodide.

*Analysis.*—Calculated for $C_{23}H_{30}INO_2$: C, 57.62; H, 6.31; N, 2.92. Found: C, 57.43; H, 6.03; N, 2.98.

This compound is a ganglionic blocker.

*Example 8.—4-(1-benzyl-2-piperidyl)-2,2-diphenyl-1,3-dioxane*

2,2-diphenyl-4-(2-piperidyl)-1,3-dioxane hydrochloride was converted to the free base by equilibration with aqueous caustic and ether. The ether solution was separated, dried over potassium carbonate, and evaporated to an oil on the steam bath (15 mm.). It was dissolved in dry benzene and treated with benzyl bromide. After several days the precipitate was removed and the filtrate was concentrated to an oil which was taken up in isopropanol and treated with hydrogen chloride to give a precipitate which was recrystallized several times from methanol to give 4-(1-benzyl-2-piperidyl)-2,2-diphenyl-1,3-dioxane hydrochloride, melting at 232°.

*Analysis.*—Calculated for $C_{28}H_{31}NO_2 \cdot HCl$: C, 74.73; H, 7.17; Cl, 7.88. Found: C, 73.20; H, 7.37; Cl, 7.55.

This compound is a preferential parasympathetic ganglionic blocker and anticholinergic agent.

*Example 9.—5-(2-piperidyl)-spiro[1,3-dioxane-2,9'-fluorene]*

Following the procedure of Example 1, 19.6 g. of 2-(2-piperidyl)-1,3-propanediol hydrochloride was condensed with 22.5 g. of 9,9-dimethoxy-fluorene to give a crude product which was recrystallized from methanol-isopropanol and then from methanol to give 8.4 g. of 5-(2-piperidyl)-spiro[1,3-dioxane-2,9'-fluorene]hydrochloride melting at 201° with decomposition.

*Analysis.*—Calculated for $C_{21}H_{23}NO_2 \cdot HCl$: C, 70.47; H, 6.76; Cl 9.91. Found: C, 69.60; H, 6.81; Cl, 9.75.

This compound has high local anesthetic and spasmolytic activity.

The intermediate 9,9-dimethoxyfluorene was prepared from 9,9-dichlorofluorene which was in turn prepared from 9-fluorenone by the method of F. E. Ray and C. E. Albertson, J. Am. Chem. Soc., 70, 1954 (1948). 101 g. of the 9,9-dichlorofluorene was converted to the 9,9-dimethoxyfluorene. The crude product was obtained by evaporation of the methanol and was recrystallized from benzene to give 58 g. of product melting at 87°.

*Example 10.—3-(2-piperidyl)-1,5-dioxaspiro-[5.5]undecane*

25 g. of 2-(2-piperidyl)-1,3-propanediol hydrochloride and 30 g. of cyclohexanone were dissolved in 150 milliliters of isopropanol and sufficient dry hydrogen chloride gas was admitted beneath the surface to acidify the reaction mixture. The solution was allowed to stand at room temperature (the reaction may be accelerated by heating on the steam bath) for several days. The crystalline precipitate was separated and recrystallized from isopropyl alcohol to give 3.9 grams of 3-(2-piperidyl)-1,5-dioxaspiro[5.5]undecane hydrochloride melting at 196–197°.

*Analysis.*—Calculated for $C_{14}H_{25}NO_2 \cdot HCl$: C, 60.96; H, 9.50; Cl, 12.86. Found: C, 61.13; H, 9.41; Cl, 12.92.

*Example 11.—9-chloro-3-(2-piperidyl)-1,5-dioxaspiro[5.5]undecane*

Following the procedure of Example 10, 19.6 grams of 2-(2-piperidyl)-1,3-propanediol hydrochloride was condensed with 13.2 grams of 4-chlorocyclohexanone. The crude product was washed with ether and then converted to the free base by equilibration with aqueous sodium hydroxide and ether. Evaporation of the magnesium sulfate dried ether extracts gave an oil which precipitated when treated with sufficient ethereal hydrogen chloride to neutralize the base. The precipitate was recrystallized from isopropanol to give 8 g. of 9-chloro-3-(2-piperidyl)-1,5-dioxaspiro[5.5]undecane hydrochloride melting at 212°.

*Analysis.*—Calculated for $C_{14}H_{24}ClNO_2 \cdot HCl$: C, 54.19; H, 8.12; Cl, 22.86. Found: C, 54.15; H, 7.88; Cl, 22.68.

This compound possesses anti-inflammatory activity.

*Example 12.—9-methyl-3-(2-piperidyl)-1,5-dioxaspiro[5.5]undecane*

Following the procedure of Example 10, 19.5 grams of 2-(2-piperidyl)-1,3-propanediol hydrochloride was condensed with 11.2 g. of 4-methylcyclohexanone to give a crude product which was purified as described in Example 11 and finally recrystallized from isopropanol-ether to give 1.4 grams of 9-methyl-3-(2-piperidyl)-1,5-dioxaspiro[5.5]undecane melting at 202–204°.

*Analysis.*—Calculated for $C_{15}H_{27}NO_2 \cdot HCl$: C, 62.16; H, 9.74; Cl, 12.23. Found: C, 61.56; H, 9.81; Cl, 12.47.

This compound possesses spasmolytic activity.

A novel class of compounds having useful anti-lipase activity and otherwise structurally corresponding to the 2-carbocyclic compounds of this invention are those in which the 2-position carbon atom of the dioxane ring is substituted with two alkyl groups each containing from 4 to 16 carbon atoms. Those compounds in which the alkyl groups have from 4 to 8 carbon atoms each have particularly pronounced activity. Surprisingly, the corresponding dialkyl compounds in which each alkyl group contains less than 4 carbon atoms are substantially devoid of this activity as are the 2-carbocyclic compounds of this invention.

Compounds which can be prepared by the methods described herein or alternate techniques obvious to those skilled in the art are those in which the 2-cyclic substituted dioxane structure described herein have as its 4-position substituent a 2-pyrrolidyl-, 3-pyrrolidyl-, 2-morpholinyl-, 2-piperazinyl, 2-hexahydropyrimidinyl, 2-imidazolinyl, the corresponding N-methyl and other N-lower alkyl heterocyclics and other non-aromatic heterocyclic ring systems attached by a ring carbon atom to the dioxane ring and containing one or more ring nitrogen atoms. These compounds, while not part of the present invention, have similar but not equivalent utility, especially by virtue of their pharmacological activity. They can, of course, be utilized as intermediates for the preparation of other compounds by virtue of their amino nitrogen atoms and can be used as rubber accelerators.

The inhibition of pancreatic lipase inhibits the absorption of triglycerides from the intestinal tract and thus causes a diminution of postprandial hyperlipemia. This activity is desirable in the treatment of cardiovascular diseases and obesity. Pancreatic lipase inhibition can be measured in vitro by observing the effect of compounds on the lipase (steapsin) catalyzed hydrolysis of triglycerides when emulsified with sodium cholate in an artificial intestinal mixture using standard conditions of pH, temperature, and time. A compound is considered to have marked lipase inhibiting activity when 200 mg. will cause a greater than 50 percent inhibition of lipolysis in a system of 100 ml. containing 1 gram cottonseed oil and 60 mg. of steapsin held for 1 hour at pH 7.0 and 38° C.

The following are two examples of such novel 2,2-dialkyl-1,3-dioxanes:

2,2-DI-HEXYL-4-(2-PIPERIDYL)-1,3-DIOXANE

Following the procedure of Example 1 above, 1-(2-piperidyl)-1,3-propanediol hydrochloride was reacted with 7,7-di-propoxytridecane to give 2,2-di-hexyl-4-(2-piperidyl)-1,3-dioxane hydrochloride.

The intermediate 7,7-di-propoxytridecane was prepared from di-hexyl ketone according to the method of N. B. Lorette and W. L. Howard, J. Org. Chem., 25, 521 (1960), B.P. 125–126° (3 mm.), $n_D^{25}$ 1.4348.

2,2-DI-HEXYL-5-(2-PIPERIDYL)-1,3-DIOXANE

Following the procedure of Example 1 above, 2-(2-piperidyl)-1,3-propanediol hydrochloride was reacted with 7,7-di-propoxytridecane to give 2,2-di-hexyl-5-(2-piperidyl)-1,3-dioxane hydrochloride.

What is claimed is:
1. A compound of the formula

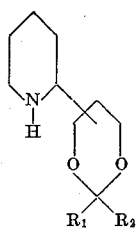

wherein $R_1$ is selected from the group consisting of phenyl, benzyl or diphenylmethyl, whose ring substituents are selected from the group consisting of hydrogen and up to two of halo, trifluoromethyl, lower-alkyl, lower-alkoxy, lower-acyloxy, carbo-lower-alkoxy, nitro, and acetamido and $R_2$ is selected from the group consisting of hydrogen, lower-alkyl and $R_1$.

2. A compound of the formula

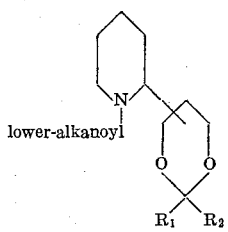

wherein $R_1$ is selected from the group consisting of phenyl, benzyl or diphenylmethyl, whose ring substituents are selected from the group consisting of hydrogen and up to two of halo, trifluoromethyl, lower-alkyl, lower-alkoxy, lower-acyloxy, carbo-lower-alkoxy, nitro, and acetamido and $R_2$ is selected from the group consisting of hydrogen, lower-alkyl and $R_1$.

3. A compound of the formula

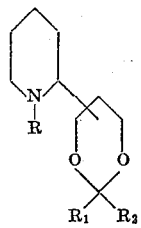

wherein R is selected from the group consisting of $R_3R_4$N-lower-alkyl and $R_3R_4$N-lower-alkanoyl wherein $R_3$ and $R_4$ are selected from the group consisting of H, lower-alkyl and, collectively with the nitrogen atom, pyrrolidino, piperidino, and morpholino, $R_1$ is selected from the group consisting of phenyl, benzyl or diphenylmethyl, whose ring substituents are selected from the group consisting of hydrogen and up to two of halo, trifluoromethyl, lower-alkyl, lower-alkoxy, lower-acyloxy, carbo-lower-alkoxy, nitro and acetamido and $R_2$ is selected from the group consisting of hydrogen, lower-alkyl and $R_1$.

4. A compound of the formula

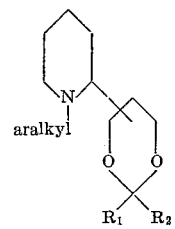

wherein aralkyl is selected from the group consisting of benzyl and phenethyl, $R_1$ is selected from the group consisting of phenyl, benzyl or diphenylmethyl, whose ring substituents are selected from the group consisting of hydrogen and up to two of halo, trifluoromethyl, lower-alkyl, lower-alkoxy, lower-acyloxy, carbo-lower-alkoxy, nitro, and acetamido and $R_2$ is selected from the group consisting of hydrogen, lower-alkyl and $R_1$.

5. 4 - (1 - benzyl - 2 - piperidyl) - 2,2 - diphenyl - 1,3-dioxane hydrochloride.

6. 2,2-diphenyl-5-(2-piperidyl)-1,3-dioxane hydrochloride.

7. 2,2-diphenyl-4-(2-piperidyl)-1,3-dioxane hydrochloride.

8. 5 - (2-piperidyl)spiro[1,3-dioxane-2,9′-fluorene]hydrochloride.

9. 2-ethyl-2-phenyl-4-(2-piperidyl)-1,3-dioxane hydrochloride.

References Cited by the Examiner
UNITED STATES PATENTS
2,606,907   8/1952   Blicke _____ 260—294.70

WALTER A. MODANCE, *Primary Examiner.*

A. D. SPEVACK, *Assistant Examiner.*